United States Patent [19]
Ohno et al.

[11] Patent Number: 4,773,260
[45] Date of Patent: Sep. 27, 1988

[54] FUEL-LEVEL DETECTING SYSTEM FOR AUTOMOTIVE VEHICLE

[75] Inventors: Junya Ohno, Zama; Michiaki Sasaki, Hadano, both of Japan

[73] Assignee: Nissan Motor Company, Ltd., Yokohama, Japan

[21] Appl. No.: 63,628

[22] Filed: Jun. 19, 1987

[30] Foreign Application Priority Data
Jun. 23, 1986 [JP] Japan .............................. 61-95673[U]

[51] Int. Cl.⁴ .............................................. G01F 15/00
[52] U.S. Cl. ......................................... 73/113; 340/59
[58] Field of Search ................. 73/306, 308, 310, 311, 73/113; 340/59, 618, 622

[56] References Cited
U.S. PATENT DOCUMENTS
4,437,162  3/1984  Kato .................. 340/618 X
FOREIGN PATENT DOCUMENTS
16258  2/1977  Japan ..................................... 73/113

Primary Examiner—Jerry W. Myracle
Attorney, Agent, or Firm—Pennie & Edmonds

[57] ABSTRACT

A fuel-level detecting system for detecting residual fuel in a fuel tank includes two fuel-level detecting sensors, one of which is disposed within one chamber of the fuel tank, the other of which is disposed within the other chamber of the fuel tank. This system can more accurately detect actual fuel-level by indicating a value in accordance with current running through a closed circuit formed by the fuel-level detecting sensors and so forth.

25 Claims, 3 Drawing Sheets (A)

(B)

FUEL-LEVEL DETECTING SYSTEM FOR AUTOMOTIVE VEHICLE

BACKGROUND OF THE INVENTION

1. Field of the Invention

The present invention relates to a fuel detecting system for an automotive vehicle. More specifically, the invention relates to a fuel detecting system for monitoring fuel consumption in an automotive engine and for detecting residual fuel in a fuel tank which defines a first fuel chamber being in communication with the automotive engine for supplying the fuel thereto and for receiving the fuel recirculating therefrom, and a second chamber supplying the fuel to the first chamber at a supply rate irrespective of consumption rate of the fuel in the first chamber.

2. Description of the Prior Art

As is well known, some fuel tanks for automotive vehicles have an inwardly projecting portion extending inwardly from the bottom of the tank to the essentially middle point of the tank. This types of fuel tank are separated into first and second fuel chambers by means of the inwardly projecting portion. In this types of fuel tank, the fuel in the fuel tank is gradually consumed until the liquid level is equal to the height of the top end of the inwardly projecting portion. Thereafter, the fuel in the second fuel chamber is gradually consumed. The fuel in the first fuel chamber is consumed after the fuel in the sub-tank region is essentially-completely consumed.

A fuel-level detecting system, which indicates the residual quantity of fuel in a tank, provided for this type of fuel tank is described in the Japanese Patent First Publication (Jikkai) Showa No. 57-109924. This fuel detecting system comprises a liquid-level detecting mechanism provided in the first fuel chamber of the tank. The liquid-level detecting mechanism includes a variable resistor associated with a float. The resistance of the variable resistor is modified depending upon the upward and downward movement of the float so that the residual quantity of fuel is expressed by a fuel gauge mounted in the interior of the automotive vehicle. In addition, a lower-limit liquid-level detecting sensor is provided on the bottom of the second fuel chamber of the tank. When the fuel in the second fuel chamber is completely consumed, the sensor detect it so that a residual-quantity warning lamp turns on.

However, the sensor is unrelated to the indication of the residual quantity of fuel. Therefore, while the fuel in the second fuel chamber is consumed after the fuel-level to the height of the top end of the inwardly projecting portion, residual quantity of fuel as indicated by means of the fuel gauge remains constant. As a result, the residual quantity of fuel indicated by the fuel gauge diverges greatly from the actually residual quantity of fuel.

SUMMARY OF THE INVENTION

It is therefore a principle object of the present invention to eliminate the aforementioned disadvantage and to provide a fuel-level detecting system for automotive vehicles, which can provide a more accurate indication of the actual quantity of fuel in a fuel tank by introducing the residual quantity of fuel in the second fuel chamber into the indication of its fuel gauge.

In order to accomplish the aforementioned and other specific objects, a fuel-level detecting system for automotive vehicles, according to the present invention, includes a first resistor means, disposed within first fuel chamber, for detecting first fuel-level in the first fuel chamber and a second resistor means, disposed within second fuel chamber, for detecting second fuel-level in the second fuel chamber. The first and second resistor means have a resistance value variable depending upon the first and second fuel level, respectively. The fuel-level detecting system further includes means for deriving a residual fuel amount indicative value based on the resistances of the first and second resistor means. The fuel-level detecting system further includes a battery for applying voltage to the first and second resistor means and a fuel gauge for indicating fuel-level in the fuel tank. According to a fuel-level detecting system of the invention, the fuel gauge can indicate fuel level in accordance with current running through closed circuit formed by the first and second resistor means, the battery and the fuel gauge.

The first resistor means preferably includes a cylindrical hollow body extending from near the bottom to near the upper wall of the first fuel chamber, a float floating on the surface of fuel within the cylindrical hollow body, a resistance wire extending vertically within the cylindrical hollow body and a movable contact mounted on the float and slidable on the resistance wire.

The second means preferably includes one or more thermal resistor(s) or liquid-level detecting switch(es).

DESCRIPTION OF THE PREFERRED EMBODIMENT

Figure 1:
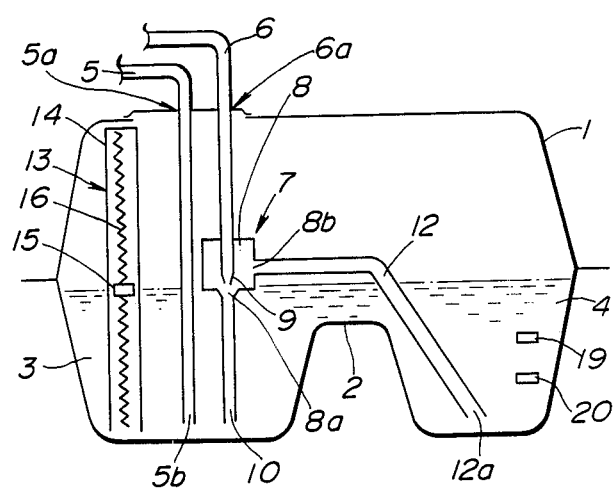
FIG. 1 is a cross-sectional view of a fuel tank to which the preferred embodiment of a fuel detecting system, according to the present invention, is applied.
Figure 2:
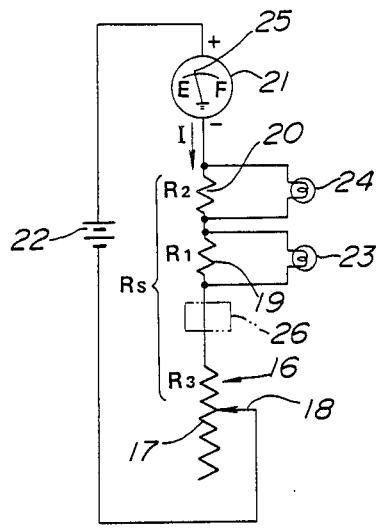
FIG. 2 is a circuit diagram of the preferred embodiment of a fuel-level detecting system according to the invention.

Referring now to the drawings, particularly to FIGS. 1 and 2, a fuel tank 1 comprises first and second fuel chambers 3 and 4. A projecting portion 2 is provided between the first and second fuel chambers 3 and 4. The projecting portion 2 extends inwardly from the bottom of the fuel tank 1 and divides the internal space of the fuel tank into the first and second fuel chambers 3 and 4. Through openings 5a and 6a are provided in the upper wall of the first fuel chamber 3. A fuel feeding pipe 5 passes through the opening 5a in such a manner that the outer periphery of the fuel feeding pipe 5 sealingly engage with the inner periphery of the opening 5a. One end of the fuel feeding pipe 5 is connected to the inlet of a fuel feed pump which is not shown. The other end of the fuel feeding pipe 5 is provided with an inlet portion 5b which is disposed within the fuel tank 1 near the bottom thereof. A fuel return pipe 6 passes through the through opening 6a in such a manner that the outer periphery of the fuel feeding pipe 5 sealingly engage with the inner periphery of the opening 6a. One end of the fuel return pipe 6 is connected to a fuel feeding device for an engine which is not shown. The other end of the fuel return pipe 6 is provided with a tapered nozzle 9 and inserted into an ejector 7 provided within the fuel tank 1. The ejector 7 comprises a hollow chamber 8. First and second ports 8a and 8b are provided on the bottom and side walls of the chamber 8, respectively. The first port 8a is in communication with one end of a fuel discharge pipe 10 which extends downwardly. The other end of the fuel discharge pipe 10 is arranged near the bottom of the first fuel chamber 3. The second port 8b is in communicate with one end of a communication pipe 12. The communication pipe 12 extends horizontally so as to pass over the projecting portion 2. The communication pipe 12 is bent downwardly near the center thereof so that the other end thereof, which is provided with an inlet for sucking fuel in the second fuel chamber 4, is arranged near the bottom of the second fuel chamber 4.

In the aforementioned fuel-level detecting system, when the fuel feed pump is actuated, fuel in the first fuel chamber 3 is supplied to the fuel feeding device through the feeding pipe 5. In addition, fuel in the fuel feeding device is returned to the fuel tank 1 through the fuel return pipe 6. The fuel returned through the fuel return pipe 6 is forcibly injected through the nozzle 9. As a result, negative pressure generated in the chamber 8 sucks fuel in the second fuel chamber 4 into the chamber 8 through the communication pipe 12 and transfers the fuel to the first fuel chamber 3 by means of the fuel discharge pipe 10.

In addition, a liquid-level detecting mechanism 13 is provided in the first fuel chamber 3. The liquid-level detecting mechanism 13 comprises a cylindrical hollow body 14, a float 15 and a variable resistor 16. The cylindrical hollow body 14 extends from near the bottom to near the upper wall of the first fuel chamber 3 in an essentially verical derection. The float 15 floats on the surface of fuel within the cylindrical hollow body 14. The variable resistor 16 comprises a resistance wire 17 extending vertically and a movable contact 18 which is mounted on the float 15 and which can slide on the resistance wire 17.

Upper and lower thermal resistors 19 and 20 having negative resistance coefficient relative to temperature are provided in the second fuel chamber 4. The upper and lower thermal resistors 19 and 20 are connected, in series, to the resistance wire 17 of the variable resistor 16 of the the liquid-level detecting mechanism 13. As shown in FIG. 2, the the upper and lower thermal resistors 19, 20 having resistances $R_1$, $R_2$ and the liquid-level detecting mechanism 13 having resistance $R_3$ are connected to each other in series so as to form combined resistance $R_s$. That is, one end of the upper thermal resistor 19 is connected, in series, to one end of the lower thermal resistor 20. The other end of the upper thermal resistor 19 is connected, in series, to one end of the resistance wire 17. In addition, the other end of the lower thermal resistor 20 is connected to the positive electrode of a battery 22, which is mounted on an automotive vehicle, by means of a fuel gauge 21. The negative electrode of the battery 22 is connected to the movable contact 18 of the variable resistor 16. A closed circuit is formed by these component.

Furthermore, liquid-level detecting switches can be substituted for the upper and lower thermal resistor 19 and 20.

In addition, warning devices 23 and 24, such as lamps and buzzers, are connected the upper and lower thermal resistors 19 and 20 in parallel, respectively.

The indicator 25 of the fuel gauge 21 approaches the Empty point, indicating the fuel tank contains no fuel, as the combined resistance $R_s$ is increased and current I in the closed circuit is decreased. Conversely, the indicator 25 of the fuel gauge 21 approaches the Full point, which indicates the fuel tank is filled with fuel, as the combined resistance $R_s$ is decreased and current I in the closed circuit is increased.

Figure 4:
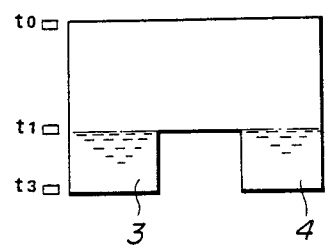
FIG. 4(A) and 4(B) are diagrams showing a state in the tank in which the fuel level is decreasing.
Figure 4:
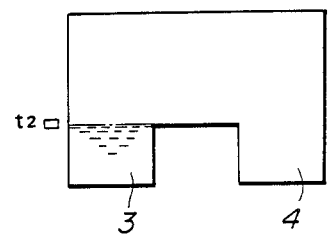
Figure 5:
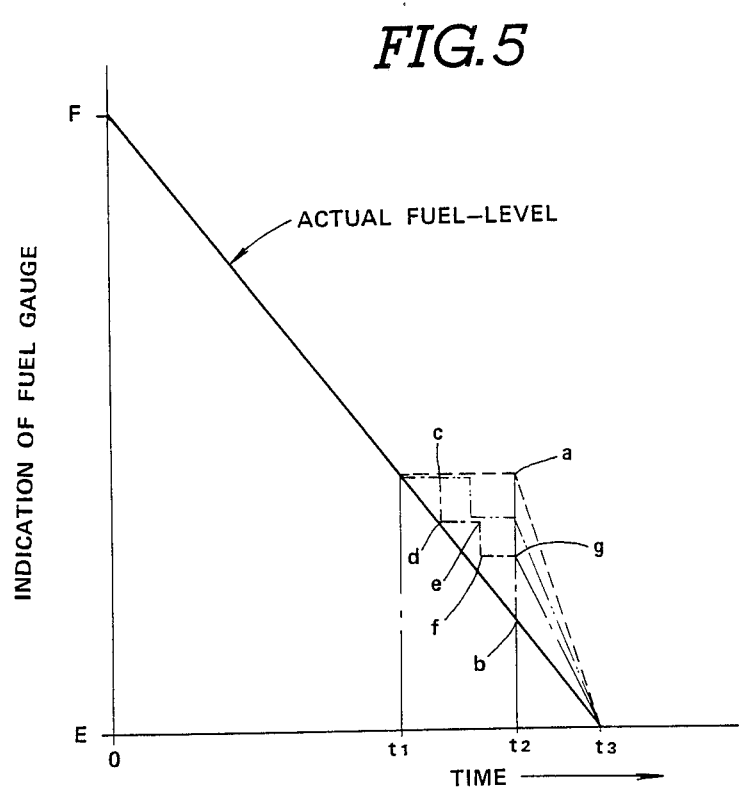
FIG. 5 is a graph showing the indication mode by a fuel gauge and acrual fuel level relative to fuel-consuming time.

In the aforementioned construction, the fuel in the fuel tank 1 decreases when the fuel feeding pump, which is not shown, is actuated. After the state in which the first and second fuel chambers 3 and 4 are filled with fuel as shown in FIG. 4(A), the fuel in the second fuel chamber 4 decreases gradually until the fuel in the second fuel chamber 4 is essentially-completely consumed. Because the fuel returned from the fuel feeding device is injected into the chamber 8 of the ejector 7 by means of the nozzle 9 and the fuel in the second fuel chamber 4 is transferred to the first fuel chamber 3 by means of the communication pipe 12, the ejector 7 and the fuel discharge pipe 10 due to ejector operation. After the fuel in the second fuel chamber 4 is perfectly consumed, the fuel in the first fuel chamber 3 decreases gradually. Therefore, the consumption of fuel expressed by the fuel gauge 21 is described as shown in FIG. 5. That is, while the amount of fuel is changing from the state shown in FIG. 4(A) into the state shown in FIG. 4(B) according to the consumption of fuel, the upper thermal resistor 19 is the first to be exposed to the air. As a result, the resistance $R_1$ of the upper thermal resistor 19 increases so as to decrease the amount of current passing through the fuel gauge 21. Therefore, the indication of the fuel gauge 21 descend from the points c to e in FIG. 5. The lower thermal resistor 20 is the second to be exposed to the air while the amount of fuel decreases. As a result, the resistance $R_2$ of the lower thermal resistor 20 increases so as to decrease the amount of current passing through the fuel gauge 21. Therefore, the indication of the fuel gauge 21 descend from the points c to e in FIG. 5.

Therefore, the preferred embodiment of a fuel detecting system, according to the present invention, can compensate the indication of the amount of fuel in the fuel tank 1 so that the amount of fuel, which is expressed by the fuel gauge 21, approaches the actual amount of fuel in the tank. In addition, according the fuel detecting system of the invention, the warning devices 23 and 24 acutuate in turn when the upper and lower thermal resistors 19 and 20 are exposed to the air, respectively, and the resistances $R_1$ and $R_2$ decrease.

Figure 3:
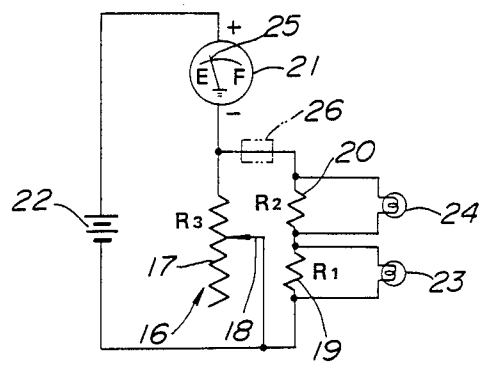
FIG. 3 is a circuit diagram of another preferred embodiment of a fuel-level detecting system according to the invention.

Another preferred embodiment of a fuel detecting device, according to the present invention, is shown in FIG. 3. The upper and lower thermal resistors 19 and 20 are connected, in parallel, to the resistance wire 17 of the variable resistor 16 of the the liquid-level detecting mechanism 13. The upper and lower thermal resistors 19, 20 having resistances $R_1$, $R_2$, which are connected, in series, to each other, are connected to the liquid-level detecting mechanism 13 having resistance $R_3$ in parallel so as to form combined resistance $R_s$. That is, one end of the upper thermal resistor 19 is connected, in series, to one end of the lower thermal resistor 20. The other end of the lower thermal resistor 20 is connected to the positive electrode of a battery 22, which is mounted on an automotive vehicle, by means of a fuel gauge 21. The other end of the upper thermal resistor 19 is connected to the negative electrode of the battery 22. In addition, one end of the resistance wire 17 is also connected to the positive electrode of the battery 22. The movable contact 18 of the variable resistor 16 is also connected to the negative electrode of the battery 22. A closed circuit is formed by these component.

Furthermore, liquid-level detecting switchs can be substituted for the upper and lower thermal resistor 19 and 20.

In addition, warning devices 23 and 24, such as lamps and buzzers, are connected the upper and lower thermal resistors 19 and 20 in parallel, respectively.

The indicator 25 of the fuel gauge 21 approaches toward the Empty point, which indicates the fuel tank contains no fuel, when the combined resistance $R_s$ increases and current I in the closed circuit is decreased. Conversely, the indicator 25 of the fuel gauge 21 approaches the Full point, which indicates the fuel tank is filled with fuel, as the combined resistance $R_s$ decreases and current I in the closed circuit is increased.

What is claimed is:

1. A fuel-level detecting system for monitoring fuel consumption in an automotive engine and for detecting residual fuel in a fuel tank which defines a first fuel chamber being in communication with said automotive engine for supplying the fuel thereto and for receiving the fuel recirculating therefrom, and a second chamber being in communication with means for supplying the fuel to said first chamber at a supply rate irrespective of consumption rate of the fuel in said first chamber, said system comprising:
   a first resistor means, disposed within said first fuel chamber, for detecting a first level of the fuel in said first fuel chamber, said first resistor means having a resistance value variable depending upon said first level;
   a second resistor means, disposed within said second fuel chamber, for detecting a second level of the fuel in said second fuel chamber, said second resistor means having a resistance value veriable depending upon said second level; and
   means, associated with said first and second resistor means, for deriving a residual fuel amount indicative value based on said resistances of said first and second resistor means.

2. A fuel-level detecting system as set forth in claim 1, wherein said means including a fuel gauge for indicating fuel-level in said fuel tank in accordance with the amount of current running through closed circuit formed by said first and second resistor means, a battery and said fuel gauge.

3. A fuel-level detecting system as set forth in claim 2, wherein said first resistor means includes a cylindrical hollow body extending from near the bottom to near the upper wall of said first fuel chamber, a float floating on the surface of fuel within said cylindrical hollow body, a resistance wire extending vertically within said cylindrical hollow body and a movable contact mounted on said float and slidable on said resistance wire.

4. A fuel-level detecting system as set forth in claim 2, wherein said first resistor means is connected, in series, to said second resistor means.

5. A fuel-level detecting system as set forth in claim 4, wherein said second resistor means includes a thermal resistor.

6. A fuel-level detecting system as set forth in claim 5, wherein said second resistor means includes a warning device.

7. A fuel-level detecting system as set forth in claim 6, wherein said warning device is a lamp.

8. A fuel-level detecting system as set forth in claim 6, wherein said warning device is a buzzer.

9. A fuel-level detecting system as set forth in claim 4, wherein said second resistor means includes a plurality of thermal resistors, which are disposed vertically and which are spaced at predetermined intervals.

10. A fuel-level detecting system as set forth in claim 9, wherein said plurality of thermal resistors are connected, in series, to each other.

11. A fuel-level detecting system as set forth in claim 9, wherein said plurality of thermal resistors are connected, in parallel, to each other.

12. A fuel-level detecting system as set forth in claim 9 wherein each of said plurality of thermal resistors includes a warning device.

13. A fuel-level detecting system as set forth in claim 2, wherein said first resistor means is connected, in parallel, to said second resistor means.

14. A fuel-level detecting system as set forth in claim 13, wherein said second resistor means includes a thermal resistor.

15. A fuel-level detecting system as set forth in claim 14, wherein said second resistor means includes a warning device.

16. A fuel-level detecting system as set forth in claim 15, wherein said warning device is a lamp.

17. A fuel-level detecting system as set forth in claim 15, wherein said warning device is a buzzer.

18. A fuel-level detecting system as set forth in claim 13, wherein said second resistor means includes a plurality of thermal resistors, which are disposed vertically and which are spaced at predetermined intermals.

19. A fuel-level detecting system as set forth in claim 18, wherein said plurality of thermal resistors are connected, in series, to each other.

20. A fuel-level detecting system as set forth in claim 18, wherein said plurality of thermal resistors are connected, in parallel, to each other.

21. A fuel-level detecting system as set forth in claim 18, wherein each of said plurality of thermal resistors includes a warning device.

22. A fuel-level detecting system as set forth in claim 2, wherein said second resistor means includes a liquid-level detecting switch.

23. A fuel-level detecting system as set forth in claim 2, wherein said second resistor means includes a plurality of liquid-level detecting switches, which are disposed vertically and which are spaced at intervals.

24. A fuel-level detecting system as set forth in claim 1, wherein said second resistor means includes a liquid-level detecting switch.

25. A fuel-level detecting system as set forth in claim 1, wherein said second resistor means includes a plurality of liquid-level detecting switches, which are disposed vertically and which are spaced at intervals.

* * * * *